Patented Jan. 9, 1923.

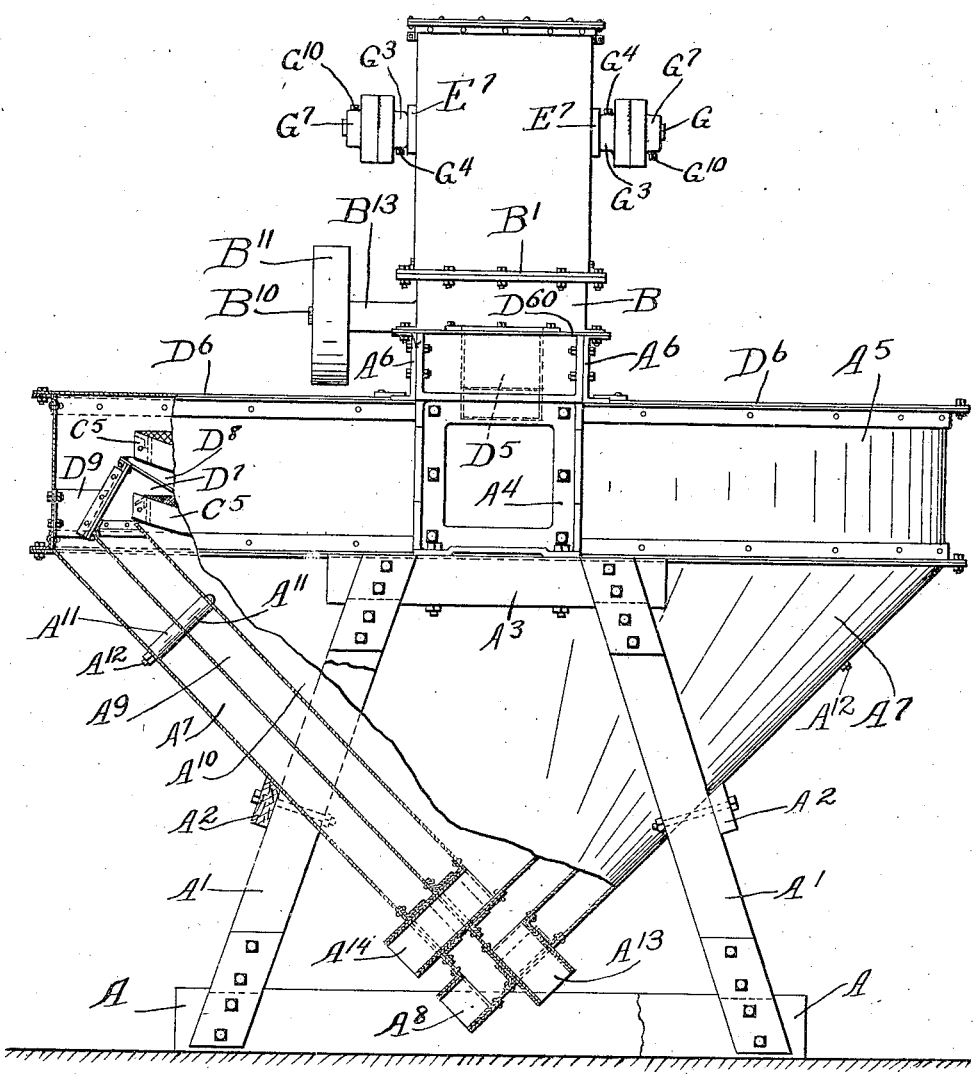

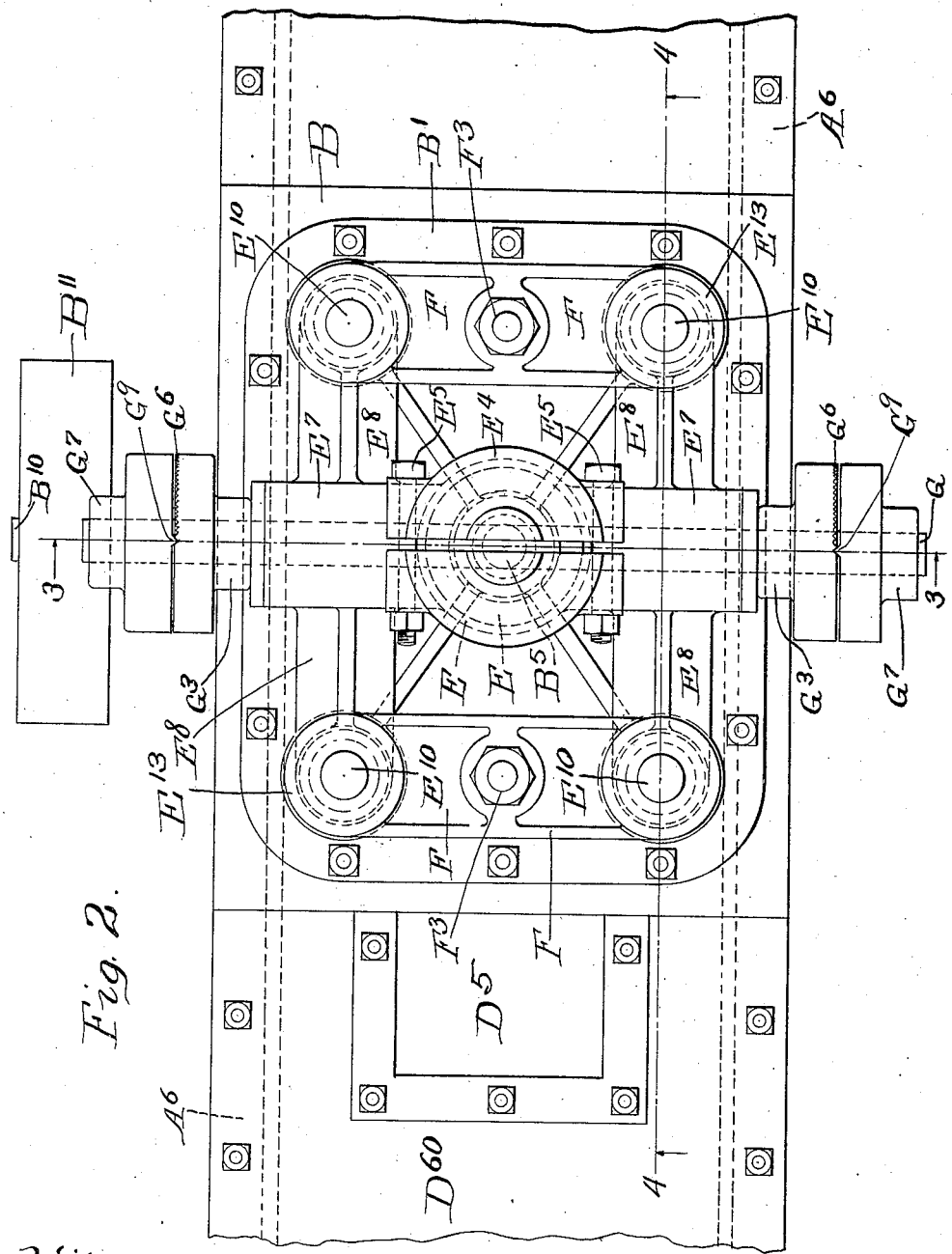

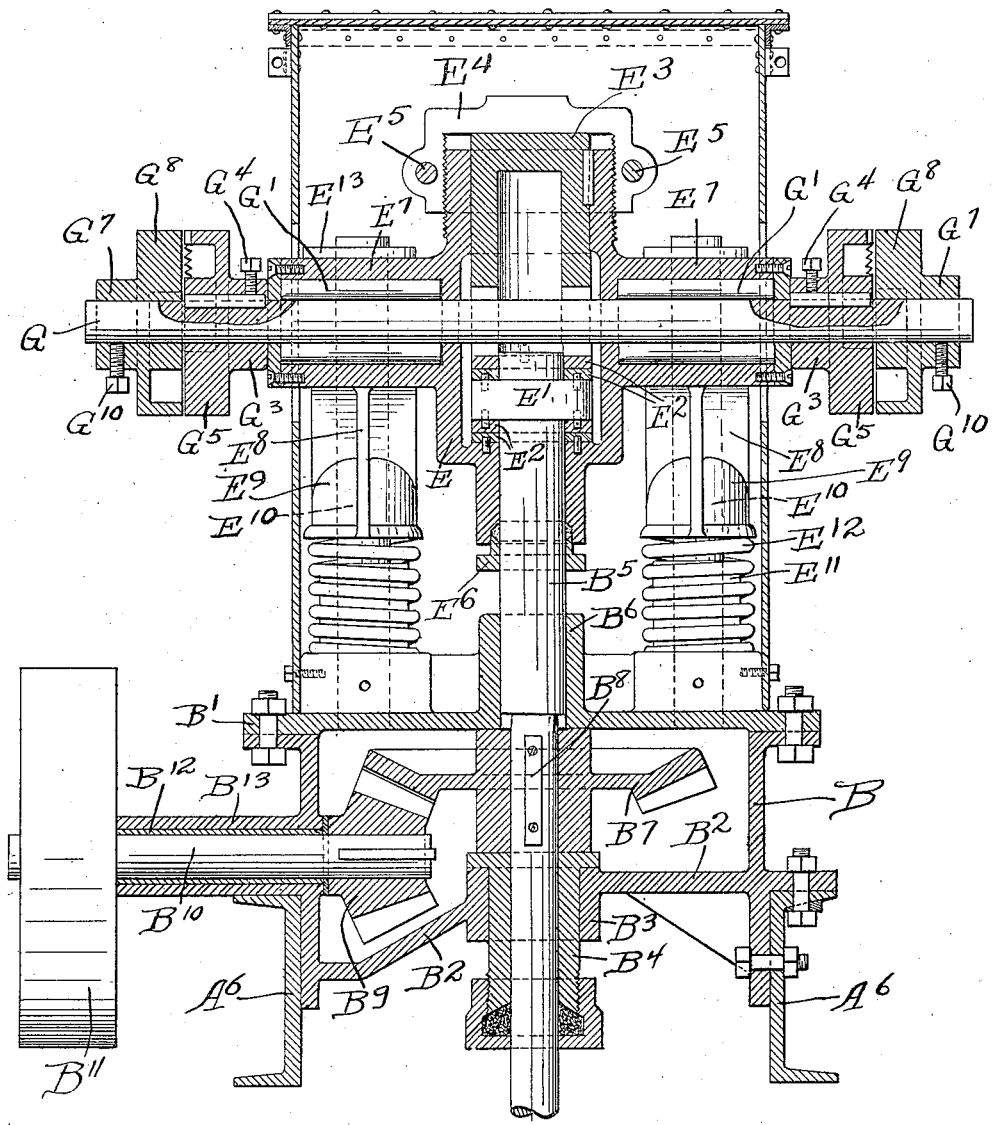

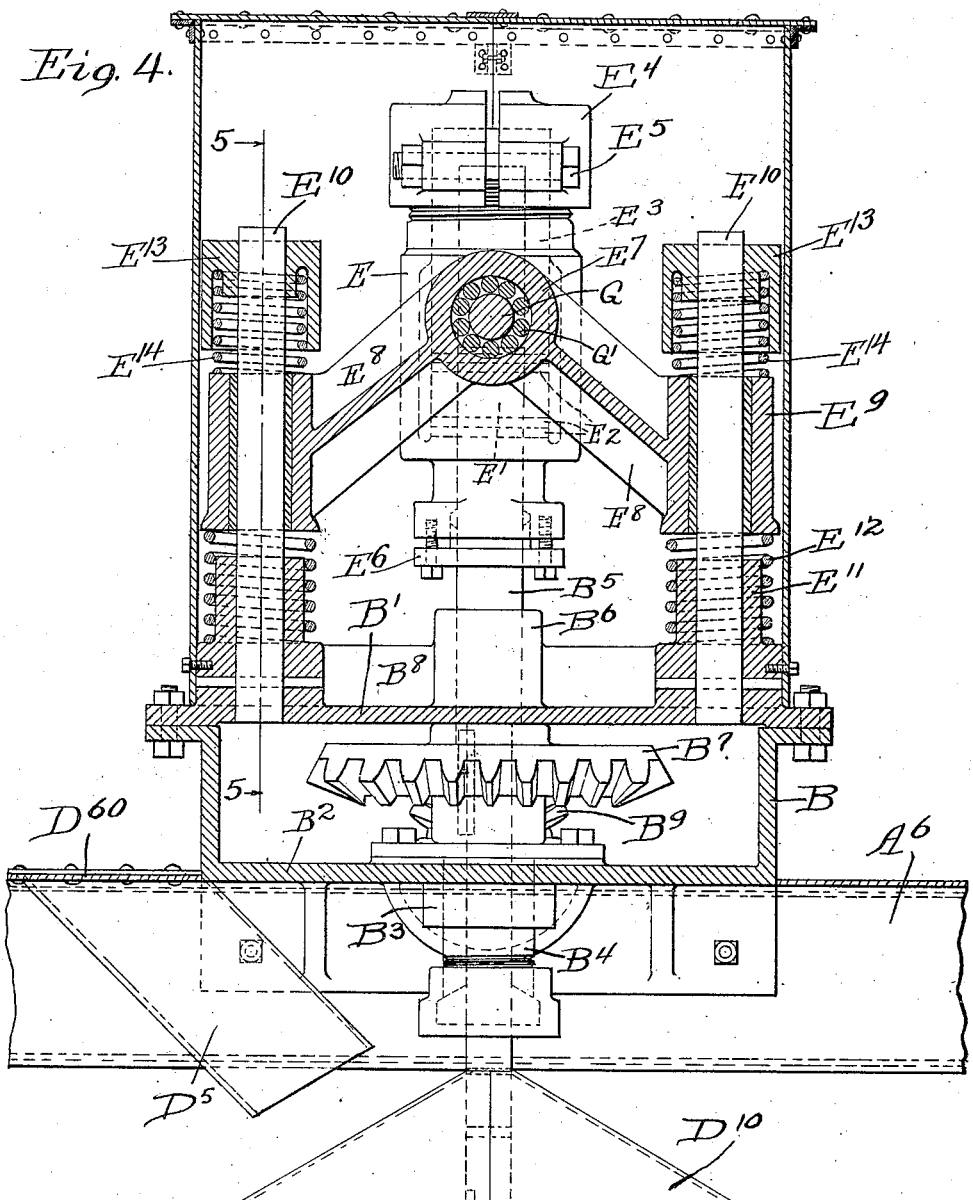

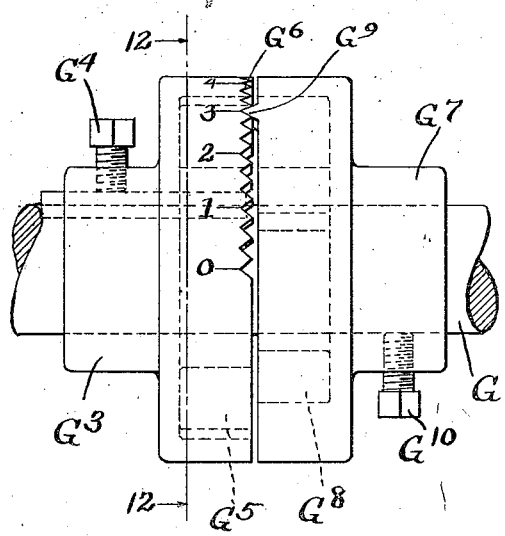
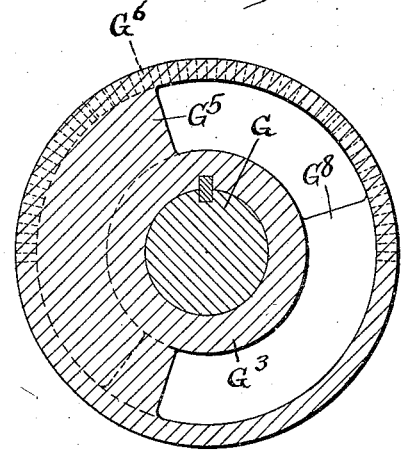
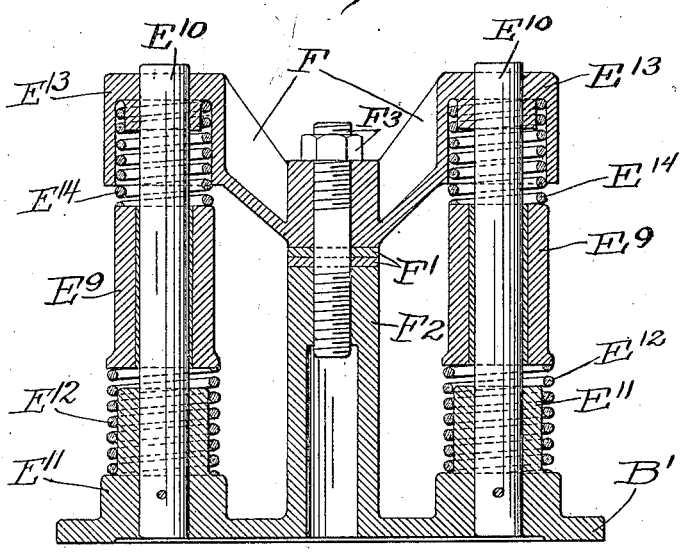

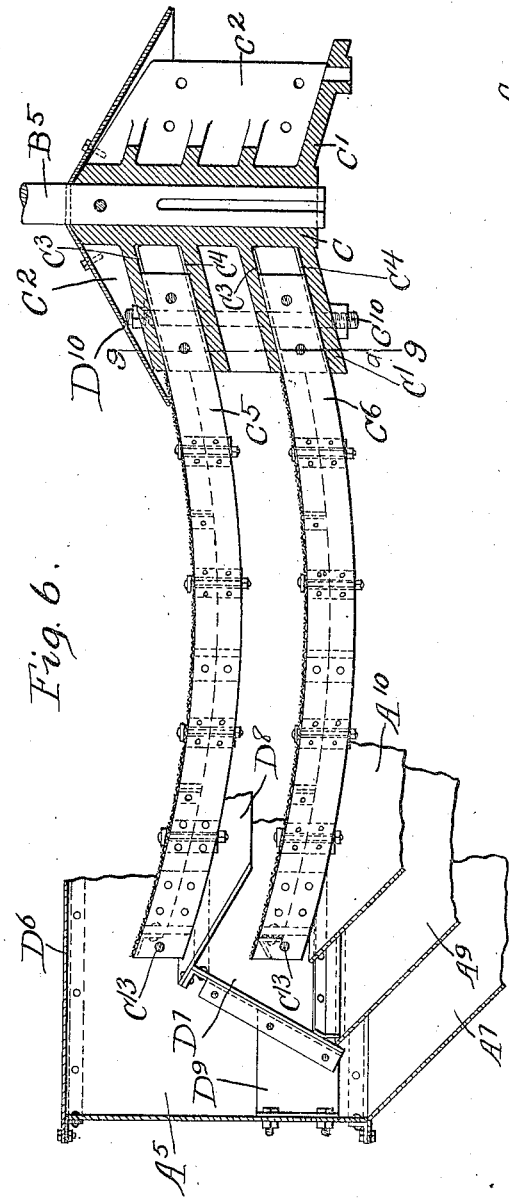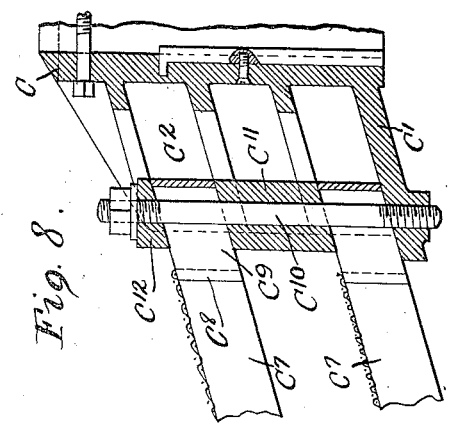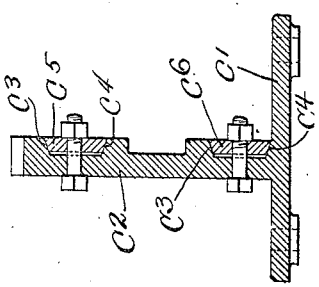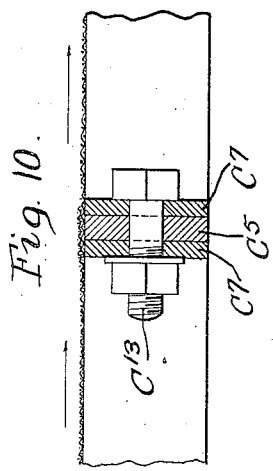

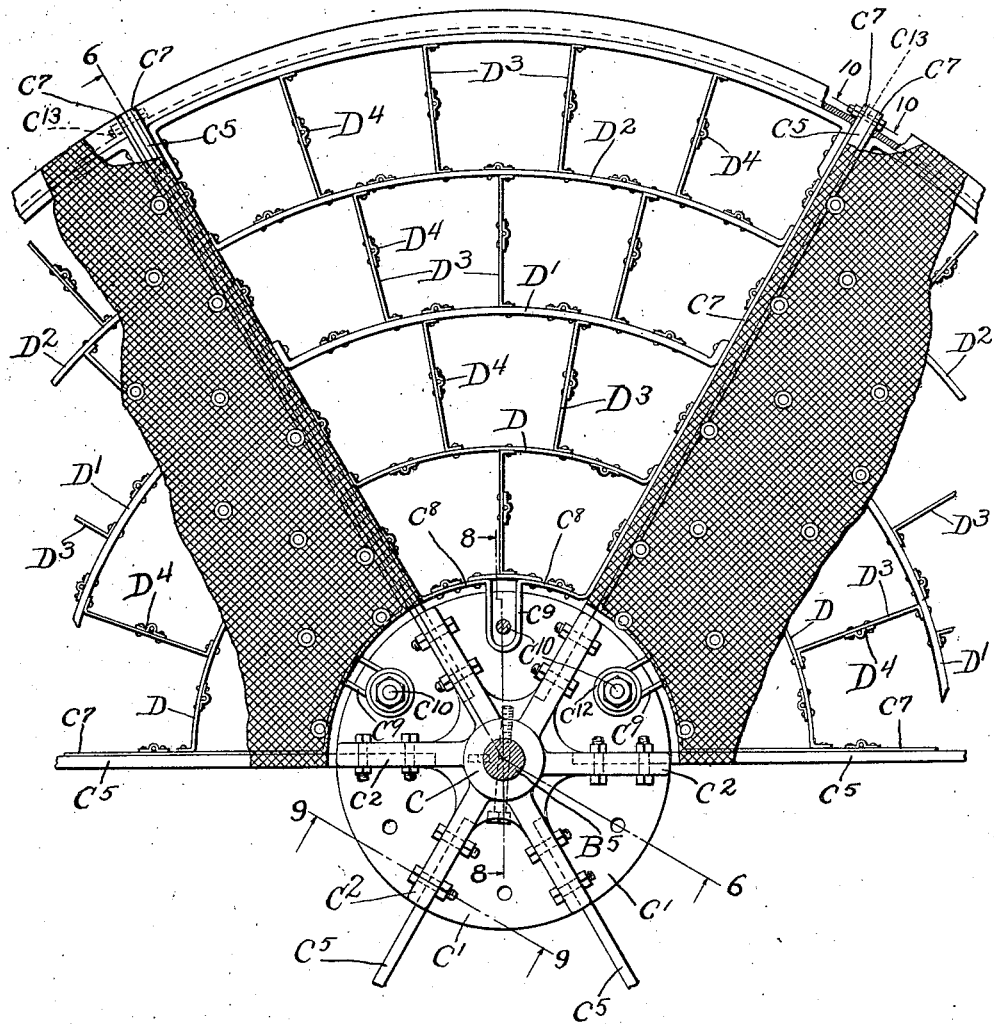

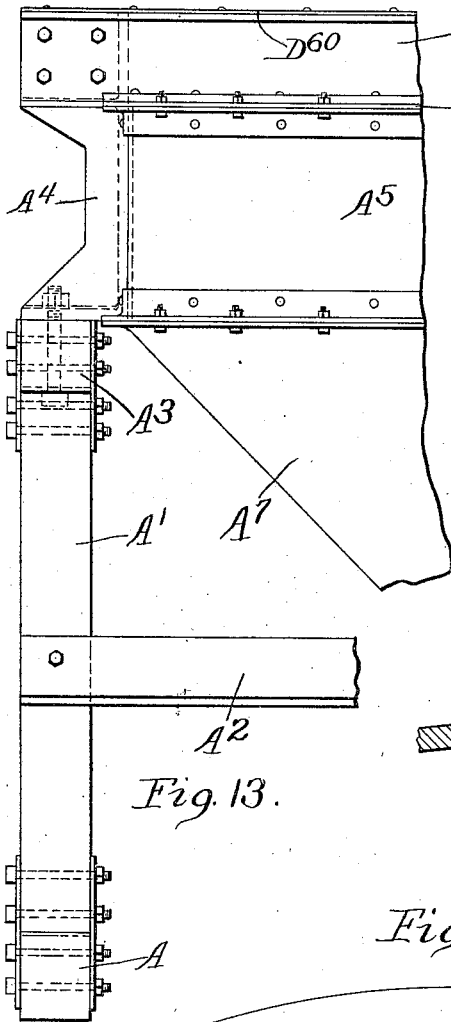
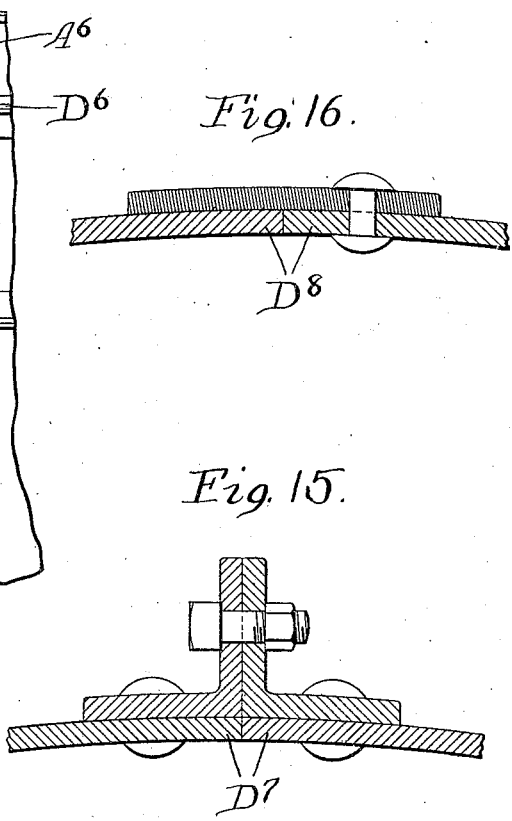
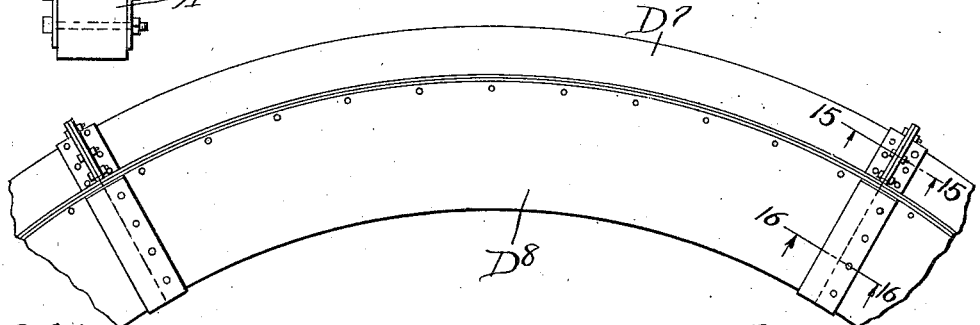

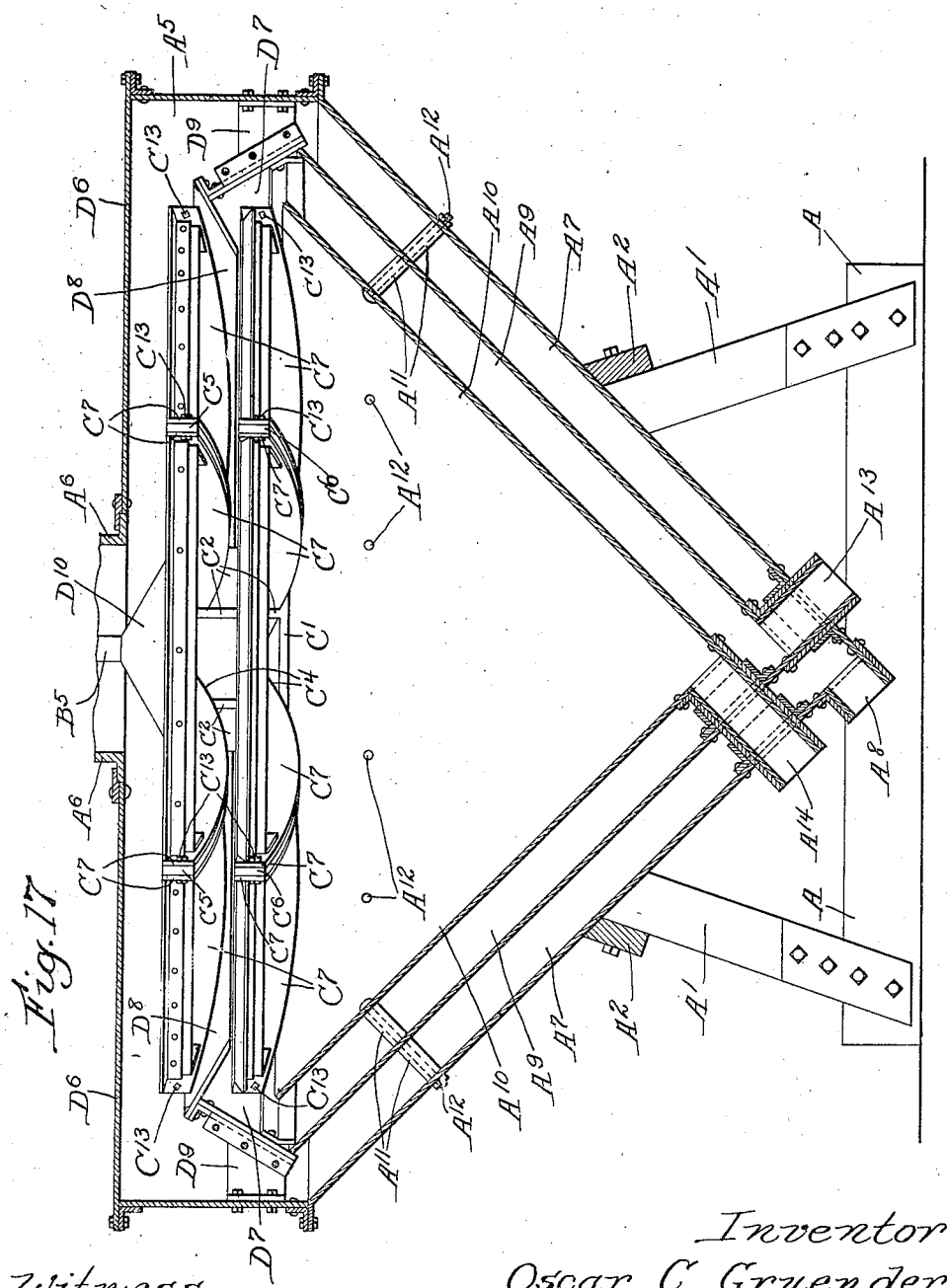

1,441,496

UNITED STATES PATENT OFFICE.

OSCAR C. GRUENDER, OF CHICAGO HEIGHTS, ILLINOIS.

CENTRIFUGAL SCREEN.

Application filed December 24, 1919. Serial No. 347,111.

*To all whom it may concern:*

Be it known that I, Oscar C. Gruender, a citizen of the United States, residing at Chicago Heights, in the county of Cook and State of Illinois, have invented a certain new and useful Improvement in Centrifugal Screens, of which the following is a specification.

My invention relates to improvements in screens and has for one object to provide a new and improved form of centrifugal, vibratory screen. Another object is to provide means for controlling the feed of a centrifugal screen. Another object is to provide new and improved means for setting up vibration in a screen or any other part where it is desirous to impart the vibratory movement. Another object is to provide a new and improved form of rigid screen construction. Other objects will appear from time to time in the specification.

My invention is illustrated more or less diagrammatically in the accompanying drawings, wherein—

Figure 1 is a side elevation in part section of my screen;

Figure 2 is a plan view of the driving mechanism;

Figure 3 is a section along the line 3—3 of Figure 2;

Figure 4 is a section along the line 4—4 of Figure 2;

Figure 5 is a section along the line 5—5 of Figure 4;

Figure 6 is a section through a part of the screen and hopper taken along line 6—6 of Figure 7;

Figure 7 is a plan view of a part of one of the screens;

Figure 8 is a section along the line 8—8 of Figure 7;

Figure 9 is a section along the line 9—9 of Figure 6;

Figure 10 is a section along the line 10—10 of Figure 7;

Figure 11 is a side view of the counterweight;

Figure 12 is a section along the line 12—12 of Figure 11;

Figure 13 is a detail side elevation of the end frame and housing showing it 90° around from Figure 1;

Figure 14 is a detail plan of a portion of a deflector and chute;

Figure 15 is a section along the line 15—15 of Figure 14;

Figure 16 is a section along the line 16—16 of Figure 14;

Figure 17 is an enlarged view of the screens and parts adjacent thereto, with parts in section;

Like figures are indicated by like characters throughout the drawings.

A A are foundation stringers from which project upwardly the inclined braces $A^1$ $A^1$ tied together by stays $A^2$. These braces carry at their upper ends, the stringers $A^3$ $A^3$ to which are bolted the yokes $A^4$ $A^4$. These yokes have bolted to them a cylindrical frame $A^5$ and carry the cross beams $A^5$ $A^6$ extending above the cylindrical frame or housing $A^5$. $A^7$ is an outer, inverted, conical chute and housing depending downwardly from the framework $A^5$. It has a single discharge pipe $A^8$ leading from its apex. $A^9$ $A^{10}$ are conical chutes inside the chute $A^7$, held in position thereon by the sleeves $A^{11}$ and holding bolts $A^{12}$ and each one of them has at its apex a discharge pipe $A^{13}$ $A^{14}$ respectively extending out through that chute which lies outside of it so that there is a free and complete discharge from the apex of each of the chutes to any suitable collector away from and outside of the machine.

Resting on the cross beams $A^5$ is a combined supporting framework and gear box B closed at the top by the removable partition and bed-plate $B^1$ and at the bottom by an integral partition $B^2$ as shown. This integral partition is apertured and provided with a hub $B^3$ in which is mounted a bearing sleeve $B^4$ for the slidably and rotatably mounted shaft $B^5$. This shaft is also guided by a hub $B^6$ in the bed-plate $B^1$ and is reduced in diameter toward its lower extremity as indicated. $B^7$ is a gear mounted on the reduced portion of the shaft and held against rotation thereabout by means of the key $B^8$ which key is so proportioned that it does not project beyond the major diameter of the shaft. $B^9$ is a pinion in mesh with the gear $B^7$. It is mounted on a shaft $B^{10}$ which is driven by any suitable power applied to the belt pulley $B^{11}$ and is contained within a bearing $B^{12}$ in the integral sleeve $B^{13}$ projecting outwardly from the housing B. The driving of this pulley causes rotation of the shaft $B^5$ and this shaft $B^5$ carries the screen itself.

C is a screen hub bolted to the lower end of the shaft $B^5$. This hub is provided with a lower conical flange $C^1$ and has projecting radially, a plurality of channeled ribs $C^2$. The channels in these ribs are, where two screen surfaces are to be used, two in number but there would be as many channels as there are to be screen surfaces. The side walls of these channels are tapered as at $C^3$ $C^4$. $C^5$ $C^6$ are curved supporting bars, their ends being tapered to fit the tapers $C^3$ $C^4$ in the walls of the channels. These bars are bolted in position as indicated. When the bolts are tightened, a tight and rigid connection is made and owing to the tapered contact, no looseness or displacement can take place. I have shown these bars six in number. There might be more or less but six is a convenient number and experience shows that this is a satisfactory arrangement. $C^7$ is a pie-shaped screen frame. It does not come to a sharp apex but is curved as at $C^8$ and has an inwardly extending loop $C^9$ adapted to penetrate between the ribs $C^2$. These screen frames are held in position by means of bolts $C^{10}$ passing through these extensions $C^9$. $C^{11}$ is a spacing sleeve on each bolt, adapted to hold the upper and lower screens apart and $C^{12}$ is a special washer adapted to rest on the upper screen frame. The bolt when tightened up, draws the inner ends of the upper and lower screen frames down snugly against the flange $C^1$. The outer portions of the screen frames are held in position by means of bolts $C^{13}$ passing through the ends of the arms $C^5$ $C^6$ and the ends of the screen frame $C^7$ on opposed screen frames so that when the assembly is completed, we have each screen frame held at its three corners, there being one attachment for each screen frame toward the center and two attachments on the periphery but the frames are not otherwise fastened to the flat supporting steel bars.

The screen frames themselves are built up of a plurality of curved segmental deep members $D$, $D^1$ and $D^2$ joined by staggered, radially disposed members $D^3$. These members carry properly spaced yokes $D^4$ which yokes are provided so that when the screen fabric has been spread out over the screen frame, bolts may be passed through the fabric to engage these yokes and thereby fasten the fabric on the frames.

When the screen fabric is a true wire fabric, the fabric is arranged so that it overlaps between each adjacent screen frame as indicated in Figure 10, the overlap being such that the open part of the joint points in the direction of movement of the material along the screen. The arrow of Figure 10 indicates that direction of movement. If the movement were otherwise, there would be danger unless the screens were tacked down and this is not desirable of material getting in under the screen and prying it off the frame or at least passing through the screen without being properly screened and separated. It will be noted, of course, that the screen frame and the radial members $D^3$, the same as the supporting bars $C^5$ $C^6$, are curved, so that the screen is not flat but curved, first, downwardly from its center toward low point about half way to the periphery and then upwardly toward the periphery. $D^{10}$ is a distributing cone proper and made in two halves bolted to the hub $C$. It extends down over the hub a slight distance onto the screen to insure that all material discharged upon the screen through the feed spout $D^5$ will be conveyed down onto the body of the screen and will not get into the supporting hub and thus pass through the screen without being properly separated. $D^6$ is a cover and may be made in one or more parts and it rests upon the upper boundary of the frame $A^5$ to enclose the screen itself. The chute $D^5$ discharges through the portion $D^{60}$ of the cover spanning the space between the cross beams $A^6$ $A^6$. This cover is, of course, removable either in whole or in part. The chute $A^{10}$ terminates immediately beneath the periphery of the lower screen. The chute $A^9$ terminates outside of the chute $A^{10}$ at substantially the same height. The idea is that the fines which pass through the lower screen will be caught by the chute $A^{10}$. The particles which do not pass through the lower screen but pass across its surface, will be thrown out and caught by the chute $A^9$. Their outer movement will be limited by a deflector $D^7$ which rests upon the upper wall of the chute $A^9$ and this deflector $D^7$ carries a chute $D^8$ which extends in beneath the periphery of the upper screen so that material thrown by centrifugal force across and away from the upper screen and not able to pass through it, will be thrown clear out and pass beneath the chute $A^9$ in the chute $A^7$. There are then three separations or three products obtained by the three screens; the coarsest product which will not pass through the upper coarser screen going through the chute $C^7$, the intermediate product which passes through the coarser screen and will not pass through the lower fine screen, will be caught by chute $A^9$ and the fine which passes through both screens will be caught in the chute $A^{10}$. The deflector $D^7$ with its chute $D^8$ as above stated, rests upon the upper periphery of the chute $A^9$ and may be steadied if need be by the braces $D^9$ from the frame $A^5$. If for instance the screen is made in six parts as indicated, then if the deflector $D^7$ is made in seven parts to complete the circle, it would be possible to take out one screen segment and by moving the screen to successively take out and replace each one of the deflector segments. If the deflector segments are made in five or six sections then it will be necessary to take out two of the screen sections and one of the holding bars. The former construction is therefore the preferred but it might be desirable to choose the other or some other construction under some conditions.

E is a cylindrical housing surrounding the upper end of the shaft $B^5$. On that shaft is a thrust collar $E^1$ which is located within the thrust bearings $E^2$ $E^2$, one of them seated on the bottom of the housing, the other held in position by a slotted cap $E^3$ which in turn is held in the housing by a split screw-threaded cap $E^4$ which may be by tightening up the bolts $E^5$ clamped in position on the screw threads and thereby permanently held against displacement. The sleeve $E^3$ is keyed as indicated so that it does not rotate. $E^6$ is a gland surrounding the shaft $B^5$ to exclude dust and retain the lubricant. $E^7$ $E^7$ are sleeves projecting radially from the housing E and these sleeves are provided with downwardly inclined heavy supporting arms $E^8$ $E^8$ which terminate in vertically disposed bearing sleeves $E^9$, there being one at the end of each of the four arms. These bearing sleeves are slidable along guide pins $E^{10}$ being provided with anti-friction liners as indicated. These guide pins $E^{10}$ project upwardly from the cover $B^1$ and are pinned within the upwardly projecting hubs $E^{11}$. These hubs support the guide pins, serve as limits to limit the downward movement of the bearing sleeves $E^9$ and are surrounded by and positioned about the coil springs $E^{12}$ which yieldingly resist downward movement of the sleeves $E^9$. $E^{13}$ $E^{13}$ are caps rigidly mounted on the pins $E^{10}$. They enclose the coil springs $E^{14}$ which engage the upper ends of the sleeve $E^9$ and yieldingly resist their upward movement and these caps extend downwardly as indicated to position the spring and also limit the upper movement of the sleeves $E^9$.

The caps $E^{13}$ are held rigidly on the pins $E^{10}$ in pairs by arms F which rest upon adjusting washers $F^1$ on the hub or bracket $F^2$ projecting upwardly from the cover $B^1$. These arms are rigidly seated on these adjusting washers by the nut and bolt $F^3$ as shown so that the sleeves $E^9$ while free to slide along the shafts or pins $E^{10}$ are always contained between the upper and lower spiral springs which springs rest upon adjustably but rigidly positioned abutments.

G is a vibratory shaft. It is mounted for rotation in roller bearings $G^1$ $G^1$ in the sleeves $E^7$ $E^7$ and passes through the slotted cap $E^3$ and above the end of the shaft $B^5$. Mounted upon the opposed ends of this shaft G are identical adjustable counterweights made up of two somewhat similar cooperating members. A description for one of the counterweights suffices for both. The inner counterweight is provided with a hub $G^3$ keyed on the shaft G and held in position by a set screw $G^4$. This counterweight is preferably hollowed out as indicated and contains a segmental counterweight member $G^5$ extending preferably something less than 180°. On the face of this counterweight assembly are a series of adjusting teeth $G^6$ which may or may not be marked with indices indicating the degree of throw to be given to the screen by any certain adjustment. $G^7$ is a hub mounted for rotation on the shaft G. It carries a similar counterweight assembly containing the counterweight $G^8$. There is a single tooth $G^9$ on this assembly and it is adapted to engage between any two of the teeth $G^6$, the idea being that by releasing the set screw $G^{10}$, the outer counterweight may be moved a little to one side and rotated on the shaft when it may be slid back to bring the single tooth in engagement with the group at any desired point. The set screw being then tightened up, the parts will remain in that position until the set screw is released. These two counterweight members together, since their outer surfaces are smooth, can serve as a belt pulley whereby a belt may be applied to rotate the vibrating shaft. It will be understood, of course, that when the two counterweights are diametrical they will rotate without setting up any vibration but if they are thrown out of balance, by changing their angularity, vibration will be set up in the shaft depending on the rotational speed, the weight of the counterweights and the amount they are out of balance and since the structure which supports the vibratory shaft is rigidly held against lateral movement but can move up and down in a path parallel with the axis of the screen shaft, the rotation of this vibratory shaft will move the whole assembly up and down, alternately compressing and expanding the spiral springs and giving to the whole screen assembly a rapid up and down vibratory movement. It will be evident that while I have shown in my drawings an operative device, still many changes might be made in size, shape and arrangement of parts without departing materially from the spirit of my invention.

The use and operation of my invention are as follows:—

The material to be screened is fed in through the chute. Power is applied to the two shafts, one to rotate the screen to provide the centrifugal feed, the other to rotate the vibratory shaft to set up the vibrating movement of the screen which will result in screening the material.

It will be observed that the screen surfaces are both of them annularly concave, the idea being that as the material is fed down the central distributing cone, it will reach the screen at a part where, being near the center, centrifugal velocity and centrifugal feeding power is low. Therefore it is necessary in order to provide a large capacity, to speed up the flow of material. This is done by having the screen inwardly curved. Then toward the periphery the material will have been given a high velocity and therefore the centrifugal feeding power will be high. I therefore, incline the screen up so as to resist the movement. The result is that I get a generally constant radial displacement of the material as it flows from the center along its spiral path outwardly toward the periphery and the result is that with velocities constant, all parts of the screen do an equal amount of work. It will be noted that the screen parts themselves are carefully arranged and proportioned so as to be rigid. All the members which are narrow are measured in a horizontal plane and wide, measured in a vertical plane. The result is a minimum of interference or blind surfaces in the screen.

The vibratory movement is imparted to the screen by the rotation at a relatively high rate of speed of the vibratory shaft. The rotating speed is variable. Therefore the rate or rapidity of vibration may be controlled by any suitable means because in ordinary speed reduction arrangements such as used on any lathe or in connection with any power transmission means will do the work. The amplitude of vibration is controlled by changing the unbalance or the degree of unbalance of the vibrating or of the vibratory weights. As above suggested, if the two segmental weights of each pair are diametrically opposed, they will be in balance and no vibration will take place. If instead of being diametrically opposed, they are on the same sides of the center of rotation, the heaviest possible vibration will take place and the degree of vibration or the degree of stroke will vary with the movement of the counter-weights toward and away from the position of balance, that is the position where their centers of gravity are separated by an angle of 180°. It will be remembered that centrifugal force even of a light weight such as shown is considerable and quite sufficient to set up pulsations or vibrations that will throw the whole screen assembly up and down. Of course, in order to prevent tearing the machine to pieces, it is necessary to cushion the vibratory movement and that is done by four pairs of coil springs which tend to yieldingly hold the screen and all associated parts in a central position. As the vibratory shaft operates, first the upper and then the lower springs are compressed and vibration will be set up.

The four guide rods are quite sufficient to provide all lateral movement and to absorb all unbalanced force tending to cause movement in any direction other than along the vertical line. The result is that I have a screen with a rapid centrifugal feed, a rigid screen bed and a rapidly controllable vibrating of fluttering screening member. A relatively light and simple foundation is all that is necessary to support the entire apparatus.

I claim:

1. A screen, means for feeding material thereacross, and separate and independent means for giving it a vibratory movement normal to the line of travel of such material, said means comprising a shaft substantially parallel to the screen, a connection between it and the screen and means for imparting a lateral vibratory movement thereto, said means comprising an unbalanced member carried by the shaft, and means for holding the shaft against lateral movement in any direction except the direction of desired vibration.

2. A screen, means for feeding material thereacross, and separate and independent means for giving it a vibratory movement normal to the line of travel of such material, said means comprising a shaft substantially parallel to the screen, a connection between it and the screen and rotary means for imparting a lateral vibratory movement thereto, said means comprising an unbalanced member carried by the shaft, and means for holding the shaft against lateral movement in any direction except the direction of desired vibration.

3. A centrifugal screen, means for feeding material thereacross, and separate and independent means for giving it a vibratory movement normal to the line of travel of such material, said means comprising a shaft substantially parallel to the screen, a connection between it and the screen and means for imparting a lateral vibratory movement thereto, said means comprising an unbalanced member carried by the shaft, the unbalance of the member being adjustable to vary the amplitude of vibration.

4. A centrifugal screen, means for feeding material thereacross, and separate and independent means for giving it a vibratory movement normal to the line of travel of such material, said means comprising a shaft substantially parallel to the screen, a connection between it and the screen and rotary means for imparting a lateral vibratory movement thereto, said means comprising an unbalanced member carried by the shaft, the unbalance of the member being adjustable to vary the amplitude of vibration.

5. A screen, means for feeding material thereacross, and separate and independent means for giving it a vibratory movement normal to the line of travel of such material, said means comprising a shaft substantially parallel to the screen, a connection between it and the screen and means for imparting a lateral vibratory movement thereto, said means comprising an unbalanced member carried by the shaft, and means for holding the shaft against lateral movement in any direction except the direction of desired vibration, the unbalance of the member being adjustable to vary the amplitude of vibration.

6. A screen, means for feeding material thereacross, and separate and independent means for giving it a vibratory movement normal to the line of travel of such material, said means comprising a shaft substantially parallel to the screen, a connection between it and the screen and rotary means for imparting a lateral vibratory movement thereto, said means comprising an unbalanced member carried by the shaft, and means for holding the shaft against lateral movement in any direction except the direction of desired vibration, the unbalance of the member being adjustable to vary the amplitude of vibration.

7. A vibratory member comprising a shaft an unbalanced member carried thereby, means for rotating the shaft to set up lateral vibration thereof and means for limiting such vibration to a single radial plane and a driving connection between the shaft and the part to be vibrated.

8. A vibratory member comprising a shaft an unbalanced member carried thereby, means for rotating the shaft to set up lateral vibration thereof and means for limiting such vibration to a single radial plane and a driving connection between the shaft and the part to be vibrated and means for varying the amount of unbalance of the member to vary the amplitude of vibration.

9. A vibratory member comprising a shaft an unbalanced member carried thereby, means for rotating the shaft to set up lateral vibration thereof and means for limiting such vibration to a single radial plane and a driving connection between the shaft and the part to be vibrated, a floating bearing in which said shaft rotates and yielding means adapted to yieldingly resist displacement of the shaft in the direction of vibration.

10. A vibratory member comprising a shaft an unbalanced member carried thereby, means for rotating the shaft to set up lateral vibration thereof and means for limiting such vibration to a single radial plane and a driving connection between the shaft and the part to be vibrated and means for varying the amount of unbalance of the member to vary the amplitude of vibration, a floating bearing in which said shaft rotates and yielding means adapted to yieldingly resist displacement of the shaft in the direction of vibration.

11. A vibratory member comprising a shaft an unbalanced member carried thereby, means for rotating the shaft to set up lateral vibration thereof and means for limiting such vibration to a single radial plane and a driving connection between the shaft and the part to be vibrated, a floating bearing in which said shaft rotates and yielding means adapted to yieldingly resist displacement of the shaft in the direction of vibration, said yielding means adapted to normally hold the shaft in a neutral position so that vibration takes place on both sides of such neutral position.

12. A vibratory member comprising a shaft an unbalanced member carried thereby, means for rotating the shaft to set up lateral vibration thereof and means for limiting such vibration to a single radial plane and a driving connection between the shaft and the part to be vibrated and means for varying the amount of unbalance of the member to vary the amplitude of vibration, a floating bearing in which said shaft rotates and yielding means adapted to yieldingly resist displacement of the shaft in the direction of vibration, said yielding means adapted to normally hold the shaft in a neutral position so that vibration takes place on both sides of such neutral position.

13. A vibratory member comprising a shaft an unbalanced member carried thereby, means for rotating the shaft to set up lateral vibration thereof and means for limiting such vibration to a single radial plane and a driving connection between the shaft and the part to be vibrated and means for varying the amount of unbalance of the member to vary the amplitude of vibration, the shaft comprising two opposed unbalanced parts mounted for adjustable rotation about the shaft and so arranged that when they are separated by an angle of 180° they are in complete balance and the member is thereby balanced and as they are rotated with respect one to the other from such position, the degree of unbalance is increased.

14. A vibratory member comprising a shaft an unbalanced member carried thereby, means for rotating the shaft to set up lateral vibration thereof and means for limiting such vibration to a single radial plane and a driving connection between the shaft and the part to be vibrated and means for varying the amount of unbalance of the member to vary the amplitude of vibration, a floating bearing in which said shaft rotates and yielding means adapted to yieldingly resist displacement of the shaft in the direction of vibration, the shaft comprising two opposed unbalanced parts mounted for adjustable rotation about the shaft and so arranged that when they are separated by an angle of 180° they are in complete balance and the member is thereby balanced and as they are rotated with respect one to the other from such position, the degree of unbalance is increased.

15. A vibratory member comprising a shaft an unbalanced member carried thereby, means for rotating the shaft to set up lateral vibration thereof and means for limiting such vibration to a single radial plane and a driving connection between the shaft and the part to be vibrated and means for varying the amount of unbalance of the member to vary the amplitude of vibration, a floating bearing in which said shaft rotates and yielding means adapted to yieldingly resist displacement of the shaft in the direction of vibration, said yielding means adapted to normally hold the shaft in a neutral position so that vibration takes place on both sides of such neutral position, the shaft comprising two opposed unbalanced parts mounted for adjustable rotation about the shaft and so arranged that when they are separated by an angle of 180° they are in complete balance and the member is thereby balanced and as they are rotated with respect one to the other from such position, the degree of unbalance is increased.

16. A vibratory member comprising a shaft an unbalanced member carried thereby, means for rotating the shaft to set up lateral vibration thereof and means for limiting such vibration to a single radial plane and a driving connection between the shaft and the part to be vibrated, the driving connection comprising a shaft normally perpendicular to the vibratory shaft, bearings in which the vibratory shaft are mounted, thrust bearings associated with the connecting shaft and a connection between the vibratory shaft and the thrust bearing.

17. A shaft, bearings therefor, floating spring held supports for said bearings, means for limiting the deflection of the springs at both ends of their excursion and means for guiding the supports as the springs yield along a path normal to the axis of rotation of the shaft, means for rotating the shaft to set up lateral vibration thereof.

18. A shaft, bearings therefor, floating spring held supports for said bearings, means for limiting the deflection of the springs at both ends of their excusion and means for guiding the supports as the springs yield along a path normal to the axis of rotation of the shaft, means for rotating the shaft to set up lateral vibration thereof, there being four spring held supports with a spring on either side of each support and a separate guiding means for each support.

19. A shaft, bearings therefor, floating spring held supports for said bearings, means for limiting the deflection of the springs at both ends of their excursion and means for guiding the supports as the springs yield along a path normal to the axis of rotation of the shaft, means for rotating the shaft to set up lateral vibration thereof, there being four spring held supports with a spring on either side of each support and a separate guiding means for each support, the guiding means comprising a pin fixed in position, passing through the support and upon which the support is slidably mounted, the springs surrounding such pins, a holding yoke engaging the pair of pins on each side of the shaft adapted to compress the springs, means for adjusting the tension applied by this yoke comprising adjustable shims and means for seating the yoke thereagainst.

20. In combination with a shaft and means for imparting lateral vibrations to it, of supporting bearings therefor, a shaft perpendicular to the vibrating shaft, a thrust bearing associated therewith and a connection between the thrust bearing and the vibrating shaft bearings.

21. In combination with a shaft and means for imparting lateral vibrations to it, of supporting bearings therefor, a shaft perpendicular to the vibrating shaft, a thrust bearing associated therewith and a connection between the thrust bearing and the vibrating shaft bearings, said connection comprising a housing containing the end of the connecting shaft, a split thrust member therein, a straddling vibrating shaft adapted to seat the thrust bearing and means for locking such member in position.

22. A shaft, bearings therefor, floating spring held supports for said bearings, means for limiting the deflection of the springs at both ends of their excursion and means for guiding the supports as the springs yield along a path normal to the axis of rotation of the shaft, means for rotating the shaft to set up lateral vibration thereof, means for varying the initial deflection of the springs, a connecting shaft, a thrust bearing therefor and a connection between it and the vibrating shaft bearings.

23. A shaft, bearings therefor, floating spring held supports for said bearings, means for limiting the deflection of the springs at both ends of their excursion and means for guiding the supports as the springs yield along a path normal to the axis of rotation of the shaft and means for rotating the shaft to set up lateral vibration thereof.

24. In a screen, means for feeding material by centrifugal force across the screen and means for simultaneously giving the screen a vibratory movement by centrifugal force.

25. In a screen, means for feeding material by centrifugal force across the screen and means for simultaneously giving the screen a vibratory movement by centrifugal force, the feeding and vibrating means being independently operated.

26. In a screening mechanism, a rotating shaft, and means for rotating it, and means for imparting to it an axial vibration, comprising an unbalanced member adapted to rotate on a substantially horizontal axis.

27. In a screen, means for feeding material by centrifugal force across the screen and means for simultaneously giving the screen a vibratory movement by centrifugal force generated by an unbalanced rotating member.

28. In a screen, means for feeding material by centrifugal force across the screen and means for simultaneously giving the screen a vibratory movement by centrifugal force generated by an unbalanced rotating member, the feeding and vibrating means operating independently.

29. In a screen, means for feeding material by centrifugal force across the screen and means for simultaneously giving the screen a vibratory movement by centrifugal force generated by an unbalanced rotating member, the screen being yieldingly supported.

30. In a screen, means for feeding material by centrifugal force across the screen and means for simultaneously giving the screen a vibratory movement by centrifugal force generated by an unbalanced rotating member, the feeding and vibrating means operating independently, the screen being yieldingly supported.

31. In a screening mechanism, the combination with a driven rotating shaft of an independently rotating, vibrating member, said member adapted to impart a vibratory movement to the rotating shaft.

32. In a screening mechanism, the combination with an independently rotating shaft, of an independently driven vibrating member, said member adapted axially to vibrate said rotating shaft, and a substantially horizontally disposed screening member secured to said rotating shaft and adapted to be rotated and vibrated therewith.

33. In a screening mechanism, a rotating shaft, and means for rotating it, and means for imparting to it an axial vibration, said means comprising an independently rotated shaft adapted to rotate on an axis at a substantial angle to the axis of the rotating shaft.

34. In a screening mechanism, a rotating shaft and means for rotating it, and means for imparting to it an axial vibration comprising an unbalanced member and means for rotating it.

35. In a screening mechanism, two shafts, separate means for rotating each of said shafts, one shaft adapted to impart a vibratory movement to the other shaft.

36. In a screening mechanism, two shafts, separate means for rotating each of said shafts, one shaft adapted to impart a vibratory movement to the other shaft, a screening member secured to said vibrated shaft and adapted to rotate and vibrate therewith.

37. In a screening mechanism, two shafts, separate means for rotating each shaft, one shaft adapted to impart a vibratory movement, a yieldingly supported member adapted to be vibrated by said vibrating shaft and adapted to impart a vibratory movement to said vibrated shaft.

38. In a screening mechanism, two shafts, separate means for rotating each shaft, one shaft adapted to impart a vibratory movement, a yieldingly supported member adapted to be vibrated by said vibrating shaft, and adapted to impart a vibratory movement to said vibrated shaft, and a screening member secured to said vibrated shaft, and adapted to be rotated and vibrated therewith.

39. In a screening mechanism, two shafts and separate means for rotating each of said shafts, an unbalanced member on one of said shafts, said shaft being adapted to impart a vibratory movement to the other shaft.

40. A screen, means for feeding material thereacross, and separate and independent means for giving it a vibratory movement, said means comprising an unbalanced member, a connection between it and the screen, and means for imparting a vibratory movement to said member, and means for preventing movement of said member in any direction except the direction of desired vibration.

41. A centrifugal screen and means for rotating it, and separate and independent means for giving it a vibratory movement, said means comprising an unbalanced member, a connection between it and the screen, and means for imparting a vibratory movement thereto, and means for preventing movement in any direction except the direction of desired vibration.

42. A screen, means for feeding material thereacross, a yielding support therefor, separate and independent means for vibrating said screen, comprising an unbalanced member, and means for rotating it, and a connection between it and the screen, and means for imparting a vibratory movement thereto, in opposition to said yielding support.

43. A screen, means for feeding material thereacross, a yielding support therefor, separate and independent means for vibrating said screen, comprising an unbalanced member, and means for rotating it, and a connection between it and the screen, and means for imparting a vibratory movement thereto, in opposition to said yielding support, and means for preventing movement of said member except in the direction of desired vibration.

44. A screen and means for feeding material thereacross, and separate and independent means for giving it a vibratory movement, said means comprising a shaft substantially parallel to the screen, a connection between it and the screen and an unbalanced member carried by the shaft, and means for imparting a vibratory movement thereto, the unbalance of an unbalanced member being adjustable to vary the amplitude of vibration.

45. A screen and means for feeding material thereacross, and separate and independent means for giving it a vibratory movement, said means comprising a shaft substantially parallel to the screen, a connection between it and the screen and an unbalanced member carried by the shaft, and means for imparting a vibratory movement thereto, the unbalance of an unbalanced member being adjustable to vary the amplitude of vibration, and means for holding the shaft and unbalanced member against lateral movement in any direction except the direction of desired vibration.

46. A vibratory member comprising a shaft, an unbalanced member mounted thereon, means for rotating the unbalanced member to set up lateral vibration of unbalanced member and shaft, and means for limiting such vibration to a single radial plane, and a driving connection between the shaft and the part to be vibrated.

47. A vibratory member comprising a shaft, an unbalanced member mounted thereon, means for rotating the unbalanced member to set up lateral vibration of the unbalanced member and shaft, and means for limiting such vibration to a single radial plane, and a driving connection between the shaft and the part to be vibrated, a floating support in which said shaft is mounted, and yielding means adapted yieldingly to resist displacement of the shaft and unbalanced member in the direction of vibration.

48. A vibratory member comprising a shaft, an unbalanced member mounted thereon, means for rotating the unbalanced member to set up vibration of weight and shaft, and means for limiting such vibration to a single radial plane, and a driving connection between the shaft and the part to be vibrated, a floating support in which said shaft is mounted, and yielding means adapted yieldingly to resist displacement of the shaft and unbalanced member in the direction of vibration, the vibrated part being supported by said yielding means.

49. A shaft and a supporting yoke therefor, guiding members in sliding engagement with said yoke, spring supports for said yoke, an unbalanced member mounted on said shaft and means for rotating it to set up lateral vibration of yoke and shaft.

50. A vibrating member, guiding members in sliding engagement therewith, spring supports for said vibrating member, an unbalanced member mounted on said member and means for rotating it to set up lateral vibration of the vibrating member, said guiding members adapted to limit said lateral vibration to a single axis of movement.

51. A vibratory member comprising a yoke and an unbalanced member mounted thereon, means for rotating the unbalanced member to vibrate the unbalanced member and yoke, and means for limiting such vibration to a single plane comprising fixed guiding elements in sliding engagement with said yoke.

52. A vibratory member comprising a yoke and an unbalanced member mounted thereon, means for rotating the unbalanced member to vibrate the unbalanced member and yoke, and means for limiting such vibration to a single plane comprising fixed guiding elements in sliding engagement with said yoke, and yielding means to support said yoke.

53. The combination with a shaft and means for imparting lateral vibration thereto, of a supporting member therefor, a vibrated shaft substantially perpendicular to the vibrating shaft, a thrust bearing associated therewith and a connection between the thrust bearing and said supporting member.

54. The combination with a shaft and means for imparting lateral vibration thereto, of a supporting member therefor, a vibrated shaft substantially perpendicular to the vibrating shaft, a thrust bearing associated therewith and a connection between the thrust bearing and said supporting member, and means for limiting secondary vibration of said thrust bearing.

55. The combination with a shaft and means for imparting lateral vibration thereto, of a supporting member therefor, a vibrated shaft substantially perpendicular to the vibrating shaft, a thrust bearing associated therewith and a connection between the thrust bearing and said supporting member, and adjustable means for eliminating secondary vibration of said vibrated shaft, said means comprising a member adapted to straddle said vibrating shaft, and adjustable means for locking said member in position.

56. A centrifugal screen, a substantially vertical shaft adapted to support said screen, and means for rotating said shaft and screen, a yoke adapted to support the upper end of said shaft, yielding supporting means for said yoke, and means for vibrating said yoke, comprising an unbalanced member mounted on said yoke, and means for rotating it to impart a vibratory movement thereto in opposition to said yielding support.

57. A centrifugal screen, a substantially vertical shaft adapted to support said screen, and means for rotating said shaft and screen, a yoke adapted to support the upper end of said shaft, yielding supporting means for said yoke, and means for vibrating said yoke, comprising an unbalanced member mounted on said yoke, and means for rotating it to impart a vibratory movement thereto, in opposition to said yielding support, and means for preventing movement of said unbalanced member except in the direction of desired vibration.

58. A centrifugal screen, a substantially vertical shaft adapted to support said screen, and means for rotating said shaft and screen, a yoke adapted to support the upper end of said shaft, yielding supporting means for said yoke, and means for vibrating said yoke, comprising an unbalanced member mounted on said yoke, and means for rotating it to impart a vibratory movement thereto in opposition to said yielding support, and means for preventing lateral movement of said unbalanced member except in the direction of desired vibration, comprising a plurality of guides substantially parallel with the desired axis of vibration, said yoke being in sliding engagement therewith.

59. In a screen, means for feeding material by centrifugal force across the working face of the screen and means for simultaneously vibrating the screen by centrifugal force generated through an unbalanced rotating member.

60. In a screen, means for feeding material by centrifugal force across the screen and means for simultaneously giving the screen a vibratory movement by centrifugal force generated through an unbalanced rotating member, the feeding and vibratory means being independently actuated.

61. In a screen, means for feeding material by centrifugal force across the working face of the screen and means for vibrating the screen during such operation, by centrifugal force generated through an unbalanced rotating member, the feeding and vibrating means being independent.

62. In a screen, means for feeding material by centrifugal force across the screen and means for giving the screen a vibratory movement by centrifugal force, the screen being yieldingly supported.

63. In a screen, means for feeding material by centrifugal force across the working face of the screen, and means for vibrating the screen by centrifugal force during such operation, the screen being yieldingly supported.

64. In a screen, means for feeding material by centrifugal force across the screen and means for giving the screen a vibratory movement by centrifugal force, the feeding and vibrating means being independent, the screen being yieldingly supported.

In testimony whereof, I affix my signature in the presence of two witnesses this 8th day of December, 1919.

OSCAR C. GRUENDER.

Witnesses:
 EDITH L. PORTER,
 MINNIE M. LINDENAU.